United States Patent [19]
Hobrough et al.

[11] 3,958,232
[45] May 18, 1976

[54] IMAGE TRANSFORMATION SYSTEM WITH VARIABLE DELAY

[76] Inventors: Gilbert L. Hobrough; Theodore B. Hobrough, both of P.O. Box 35369, Vancouver 13, B.C.,, Canada

[22] Filed: June 14, 1974

[21] Appl. No.: 479,470

[52] U.S. Cl. ............... 340/324 AD; 178/DIG. 6; 178/6.8; 235/150.53; 235/181; 315/367
[51] Int. Cl.² ............................................. G06F 3/14
[58] Field of Search ............... 340/324 A, 324 AD; 315/367; 178/DIG. 6, 6.8; 235/181, 150.53

[56] References Cited
UNITED STATES PATENTS

| | | | |
|---|---|---|---|
| 3,429,990 | 2/1969 | Hobrough | 178/6.8 |
| 3,646,336 | 2/1972 | Hobrough | 235/181 |
| 3,651,253 | 3/1972 | Morgand et al. | 340/324 A |
| 3,728,479 | 4/1973 | Srinivasan | 178/DIG. 6 |
| 3,819,919 | 6/1974 | McGunigle | 235/150.53 |

*Primary Examiner*—David L. Trafton

[57] ABSTRACT

A system for the discontinuous transformation of visual images utilizing a variable delay. The visual image to be transformed is first converted to a time-varying video signal. This signal is then converted to a digital signal which is fed to a delay circuit whose time delay can be instantaneously varied. The exemplary delay circuit shown includes a random access memory which is usedc to store and release the stored digital information as a function of the desired delay. The output of the delay circuit can then be inverted to achieve the transformed visual image.

6 Claims, 11 Drawing Figures

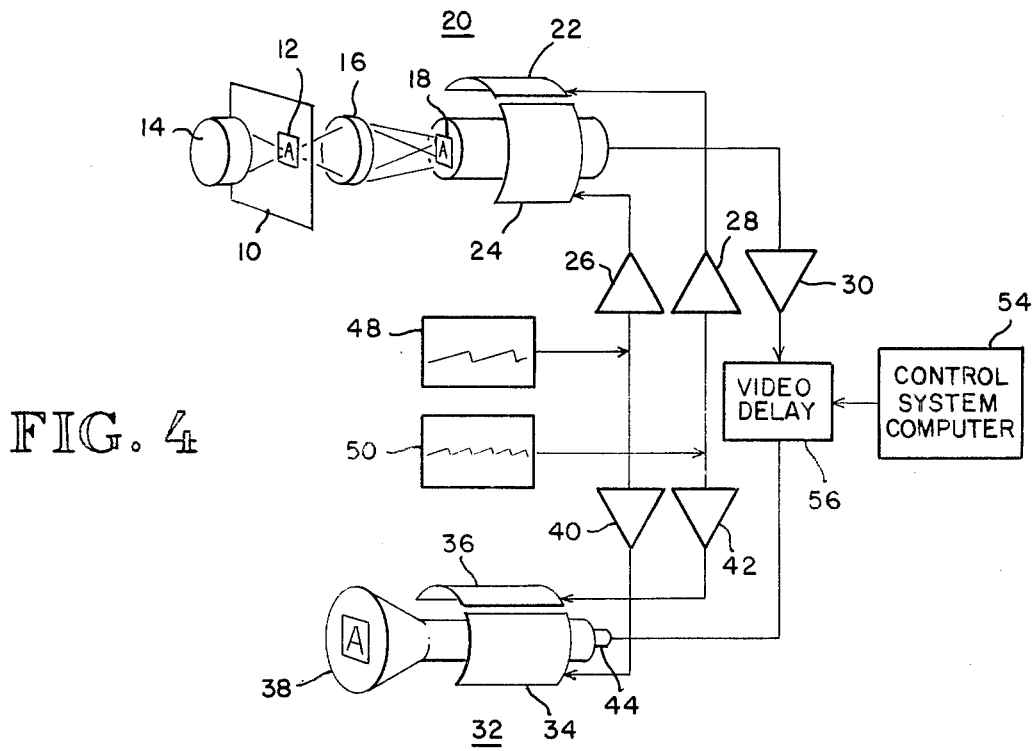
FIG. 4
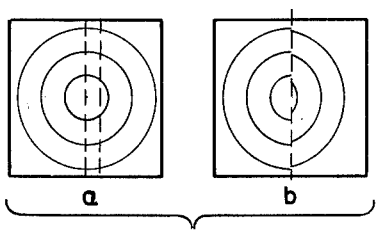
FIG. 5
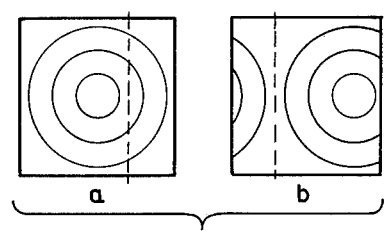
FIG. 6
FIG. 7
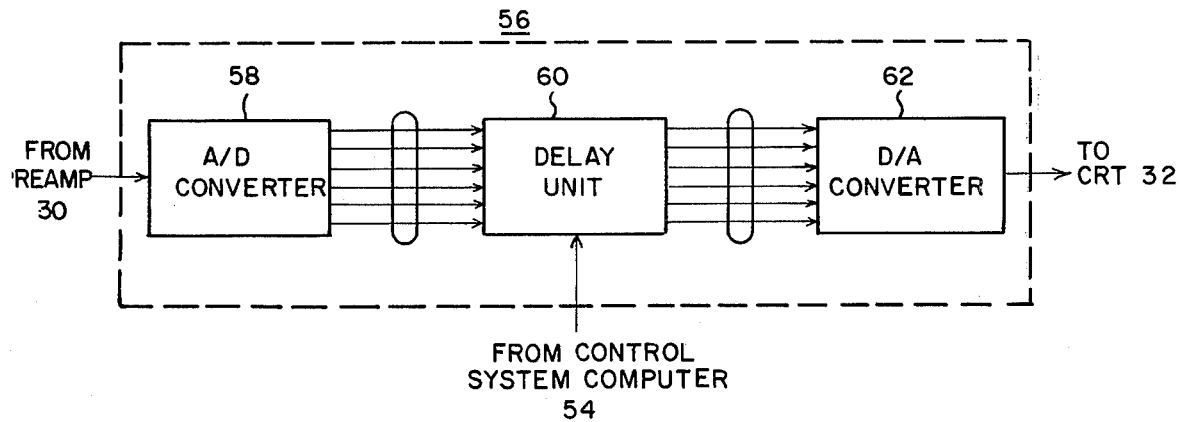

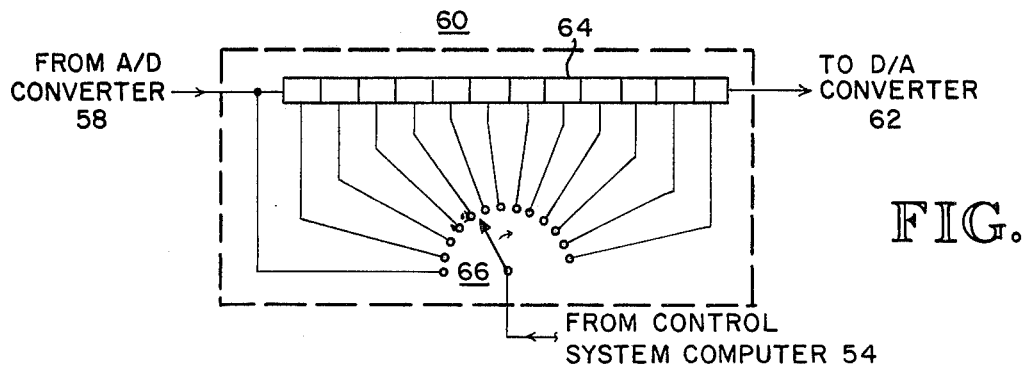
FIG. 8
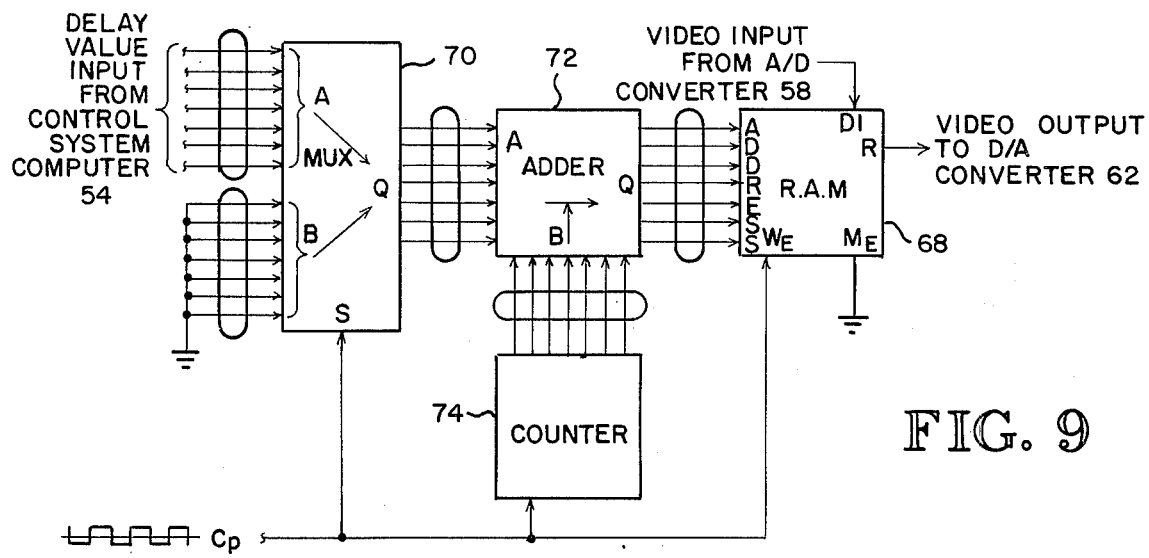
FIG. 9
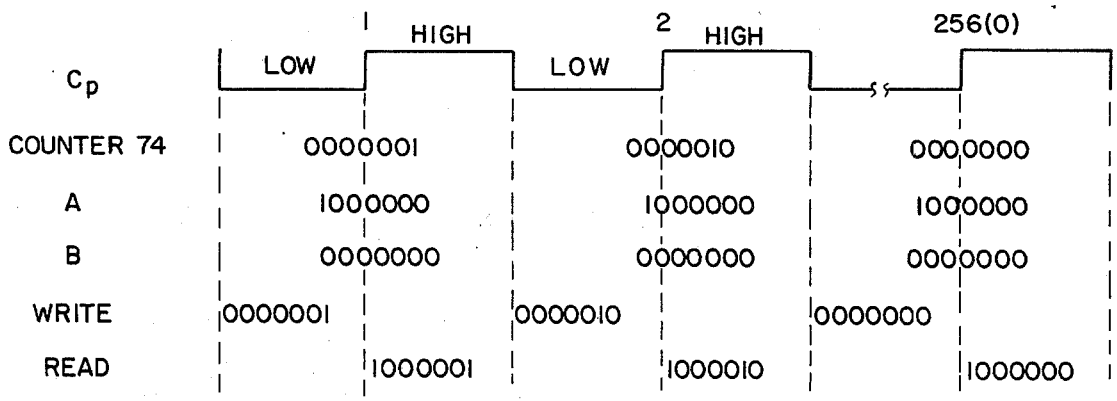
FIG. 10
FIG. 11
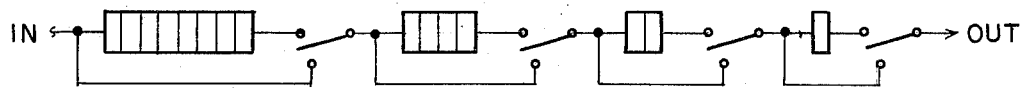

IMAGE TRANSFORMATION SYSTEM WITH VARIABLE DELAY

The present invention relates to image transformation. More specifically, this invention relates to the transformation of electronic images in the general field of photogrammetry.

The use of manual and automatic devices for the derivation of an orthophotograph from a stereo pair of aerial photographs is well known in the art of photogrammetry. Planimetric maps can be generated directly from aerial phtographs. Generations of such maps, however, involve substantially more than the simple substitution of an aerial photograph for a drawn map.

For example, the finite height of the camera at the point of exposure results in an aerial photograph which is not truly planimetric because of the radical displacements in the image position which results from terrain relief. A large building or natural obstruction will necessarily result in an aerial photograph which is either distorted in scale or totally lacking in pertinent details (or both) as the result of the obstruction in the area covered by the photograph.

The general approach to the generation of an orthophotomap from a pair of stereo photographs with manually operated orthophotoprinters is described in chapter 17 of the *Manual of Photogrammetry* published by the American Society of Photogrammetry. From the outset, however, attempts have been made to automate this process. Some early developments in the automation of stereo plotting are discussed in chapter 15 of the above-cited *Manual of Photogrammetry*.

A detailed and comprehensive system for automatically registering a pair of stereo photographs is set forth in U.S. Pat. No. 3,621,326 issued to one of the co-inventors of the present invention. In that system the stereo photographs are simultaneously scanned by flying spot scanners. The resulting video signals are electronically processed to detect parallax errors as well as first and second order distortions. A correlation system then corrects the raster signals applied to the flying spot scanners so that the stereo pair can be viewed in registration. This correlation unit is described in detail in U.S. Pat. No. 3,646,336.

Another example of an automated system for photogrammetry is described in U.S. Pat. No. 3,595,995 issued to one of the co-inventors of the present invention. That system outlines the "Gestalt Integrator" developed by Gilbert L. Hobrough for transforming the images derived from a stereo pair to achieve registration including the effects of complex high order transformations.

In manually operated systems registration error or parallax is sensed and corrected by the operator's depth perception. In the automated systems referred to above, registration is accomplished automatically by sensing relatively small areas of the two aerial photographs with some type of video scanner. Correlation circuitry examines the two video signals to determine any existing disparity which is corrected by the requisite change in the reference point.

An improved orthophotoprinter is described in U.S. Pat. No. 3,674,369. In that system the stereo pair is examined by vidicons. Correlation networks and improved slope limiting circuits are used to shape the raster signals applied to the vidicons so as to alter their scan pattern thereby eliminating the problems which are normally associated with changes in terrain elevation. This approach permits the patch printing of substantially larger areas without the usual discrepancies in the alignment of detail in adjacent patches.

In the orthophoto printer system shown in U.S. Pat. No. 3,674,369 and also in the system shown in U.S. Pat. No. 3,659,939 there is described in detail one prior art method of transforming electronic images in an orthophoto printer. Basically, these systems utilize some form of raster shaping to achieve the desired image transformation.

While the prior art system of image transformation described in the aforementioned patents was a considerable advance in the art it nonetheless has certain disadvantages which are remedied by the improved system of the present invention. Among these is that the prior art system of image transformation by raster shaping is not capable of discontinuous transformations. In addition certain types of transformation result in distortion of the image area as well as transformation of the image itself so that the resulting patches will not tesselate into a gap-free mosaic. Finally, the prior art raster shaping technique does not readily adopt itself to other types of image scanning such as solid-state scanning arrays.

Accordingly, it is an object of the present invention to provide an improved method and apparatus for the transformation of images.

It is a further object of the present invention to provide an improved method and apparatus for the transformation of images which are capable of discontinuous image transformations.

It is a still further object of the present invention to provide an improved method and apparatus for the transformation of images wherein the image can be transformed without distortion of the image area so as to result in image patches which can tesselate into a gap-free mosaic.

It is a still further object of the present invention to provide an improved storage and delay unit for utilization in such an improved image transformation system.

These and other objects of the present invention are accomplished by providing a system which will generate an electronic signal indicative of the image to be transformed, feed that electronic signal into a controlled storage and delay unit and then release the signal from the storage and delay unit in accordance with instructions from a control system computer so as to generate an electronic signal which is representative of the desired image transformation.

Other objects and advantages of the invention will become apparent from a study of the following description of the preferred embodiments when viewed in light of the accompanying drawings in which:

FIG. 4 is a block diagram of the preferred embodiment of the improved image transformation system of the present invention;

FIGS. 5 and 6 are illustrations of the type of discontinuous image transformations which can be achieved by the system of FIG. 4;

FIG. 7 is a block diagram of a preferred embodiment of the video delay unit 56 of FIG. 4;

FIG. 8 is an alternative embodiment of the delay unit 60 of FIG. 7;

FIG. 9 is the preferred alternative embodiment of the delay unit 60 of FIG. 7;

FIG. 10 is a series of waveforms illustrating the operation of the variable delay unit of FIG. 9; and FIG. 11 is a still further alternative embodiment of the delay unit 60 of FIG. 7.

The present invention is best understood by referring first to the prior art as set forth in U.S. Pat. Nos. 3,674,369 and 3,659,939.

This prior art approach to image transformation is best described with reference to FIG. 1 which is a block diagram of a system of image transformation by raster shaping. For simplicity, FIG. 1 shows only one of the pair of stereo photographs.

Figure 1:
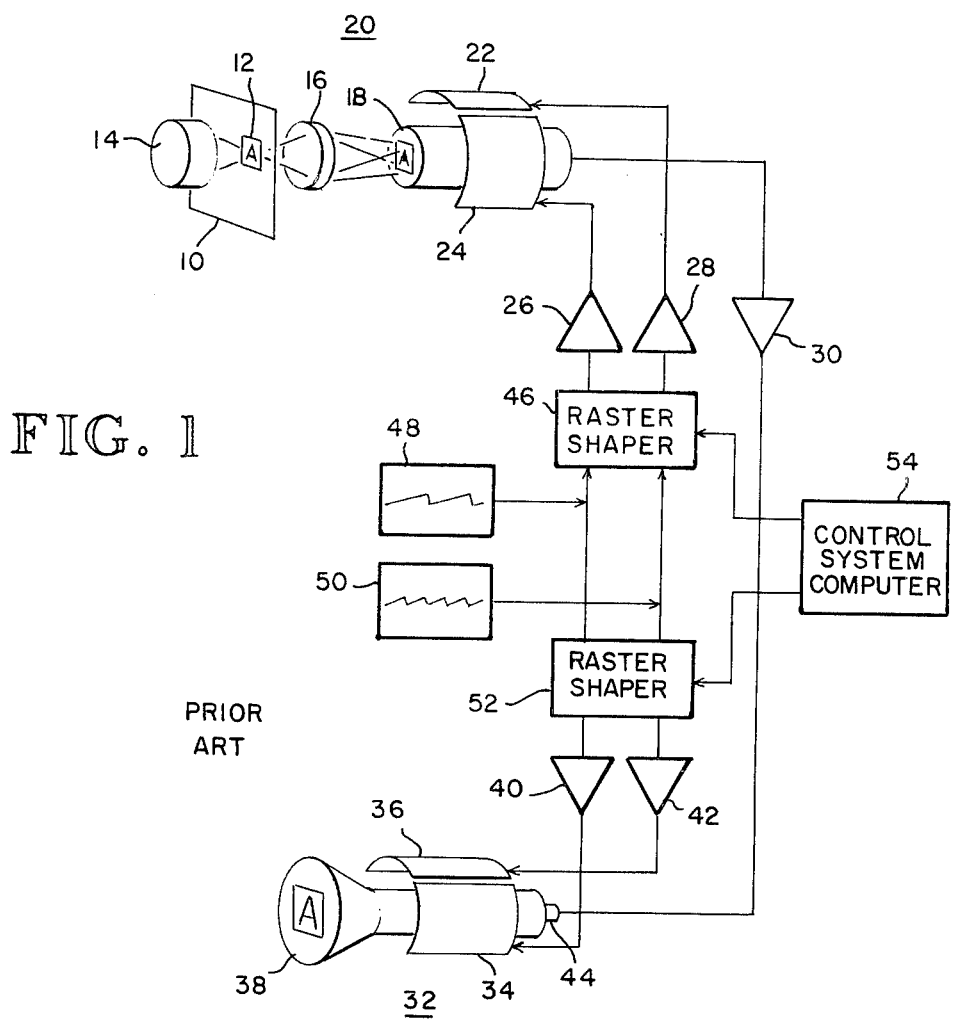
FIG. 1 is a block diagram of a prior art system of image transformation.

In FIG. 1 the image to be transformed is shown as a transparent photograph 10. A portion 12 of the photograph 10 is illuminated by a light source 14. The illuminated portion of the photograph 10 is focused by a lens 16 onto the face 18 of a conventional vidicon shown generally at 20.

The vidicon tube 20 may be of any of several well known types in general use, for example, in television cameras. In a typical vidicon tube of this type there is one or more electron guns (not shown) which generate a scanning beam which is directed generally at the center of the tube face 18. Deflection coils 22,24 are arranged in mutually perpendicular planes so as to generate the requisite magnetic fields to deflect the electron beam and scan the face 18 of the tube 20. The deflection coils 22,24 are excited by repetitive sawtooth patterns from deflection amplifiers 26,28.

The pattern followed by the electron beam depends upon the characteristics of the raster signals applied by the deflection amplifiers 26,28 to the deflection coils 22,24. A typical scanning pattern is to scan the face of the tube from left to right, moving downwardly along the face until the bottom of the scan area is reached and then returning to the top.

During the scan of the face 18 of vidicon 20 there is generated a time varying video signal representing the image 12 being focused upon the face of the tube. This time varying video signal is fed to a pre-amplifier 30.

The image which was scanned by the vidicon 20 is reproduced by some form of display device such as a cathode ray tube (CRT) 32. The CRT 32 has deflection coils 34,36 which govern the position of an electron beam which follows a pattern scanning the face 38 of the CRT 32. The path of the electron beam is determined by the raster signals applied to the deflection coils 34,36 of the CRT 32. These deflection coils are excited by the raster signals from deflection amplifiers 40,42.

Finally, the input signal to the CRT 32 is a time varying video signal applied to the electron gun (not shown) at input terminal 44.

In short, the CRT 32 operates essentially the same as the vidicon 20 except that the former displays a visual image from a time varying video signal whereas the latter generates a time varying video signal from a visual image. When the two are interconnected as shown in FIG. 1, the CRT 32 will display the image focused on the vidicon 20, provided the raster signals applied to their respective deflection coils are the same or more precisely if the raster signals result in identical scanning patterns.

As pointed out above, the raster signals to the deflection coils 22,24 of the vidicon 20 come from deflection amplifiers 26,28. These deflection amplifiers receive their input signals from a first raster shaper 46. The raster shaper 46, in turn, is connected to a pair of sawtooth generators 48,50 which function as the sources of the raster signals supplied to the deflection coils 22,24 of the vidicon 20.

In similar fashion, the deflection coils 34,36 of the CRT 32 are connected to the deflection amplifiers 40,42; a second raster shaper 52 and thence to the same sawtooth generators 48,50.

As constructed thus far it is apparent that the CRT 32 will display the image focused on the face 18 of the vidicon 20 assuming that the raster shapers 46,52 allow the outputs of the sawtooth generators 48,50 to pass through to the deflection amplifiers 26,28,40,42 without change.

At this point it should be equally apparent that the image displayed by the CRT 32 will not correspond to the image presented to the face of the vidicon 20 if one of the two raster shapers 46,52 modifies the raster signals applied to either the vidicon 20 or the CRT 32. This is precisely how the image transformation system of the prior art operates — it changes the raster signals supplied to either the vidicon 20 or the CRT 32 (ordinarily the former) in response to input signals from a control system computer 54 connected to the raster shapers 46,52.

Figure 2:
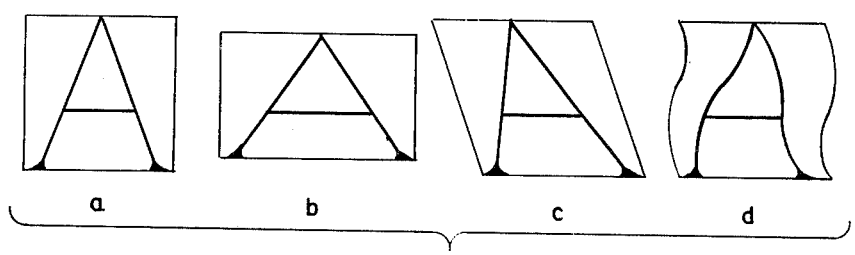
FIGS. 2 and 3 are illustrations of various types of image transformation which can be generated by the prior art system of FIG. 1.

The capabilities of the prior art image transformation system of FIG. 1 can best be explained by reference to FIGS. 2 and 3. FIG. 2(a) represents the original nontransformed image presented to the vidicon 20. The remainder of FIG. 2 are various other images which can be generated by modifying the output of raster shaper 52 which controls the raster signals applied to the CRT 32. Thus, in FIG. 2(b), the raster signals applied to the CRT 32 have been modified by the raster shaper 52 to increase the width of the scan pattern and decrease the height with the resulting transformation of the image represented by the large A. FIG. 2(c) shows the effort of a linear but skewed transformation and FIG. 2(d) illustrates a non-linear transformation with the resulting curvature of the straight lines in the original image.

One difficulty with image transformation by shaping the raster signals applied to the display CRT 32 is that the image transformation transforms both the image and the image area. This type of transformation is not acceptable for the patch printing of an orthophoto by a photogrammetric plotter since the irregularly shaped patches may not tesselate into a mosaic which is free of gaps and/or overlapping image areas.

Figure 3:
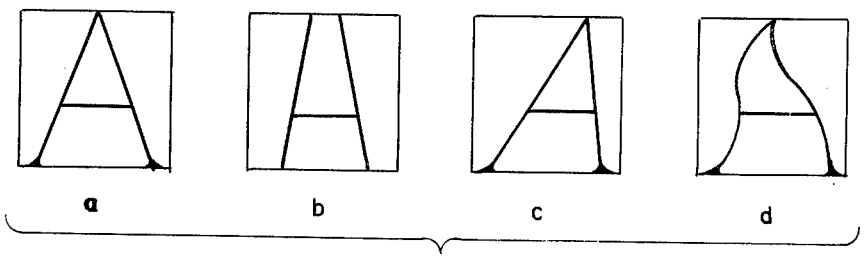

FIG. 3, on the other hand, illustrates some exemplary image transformations which can be generated by the system of FIG. 1 if the raster shaper 46 is operated to alter the raster signals applied to the vidicon 20 while retaining the raster signals applied to the CRT 32 unaffected. The images shown in FIG. 3 are the result of shaping the raster signals applied to the vidicon 20 in precisely the same fashion as was done to the raster signals applied to the CRT 32 to generate the corresponding images in FIG. 2. Thus, for example, FIG. 3(b) results from decreasing the height of the scan pattern which increases its width so that the original image appears transformed both by alternation of its proportions and by deletion of portions at the top and bottom.

The technique described above, i.e., transformation by shaping of the raster signals applied to the vidicon 20, is altogether compatible with a photogrammetric plotter since the image area is unaffected by the transformation. Patch printing is easily accomplished since the image areas are regular and will thus tesselate readily into a mosaic free of gaps or areas of image overlap. This technique is thus the preferred technique described in detail in the automatic orthophoto printers of the aforementioned U.S. Pat. Nos. 3,674,369 and 3,659,939.

Though the prior art approach exemplified by FIG. 1 constituted a major and substantial advance in the art of photogrammetry it is unable to accomplish discontinuous image transformations which are often required in photogrammetric plotting because of discontinuous terrain features.

The preferred embodiment of the present invention is set forth in FIG. 4 and as will be seen the system of the present invention has the capabilities of the prior art system of FIG. 1 with the additional import and capability of discontinuous image transformation.

The preferred embodiment of the present invention shown in block diagram in FIG. 4 corresponds in large part to the prior art system of FIG. 1. To the extent that these two block diagrams are alike, like reference numerals have been used to denote similar components and the operational description of these portions of the diagrams set forth with respect to FIG. 1 apply to FIG. 4 as well.

Briefly, the system of FIG. 4 varies from the system of FIG. 1 in that the raster shapers 46,52 have been removed and a video delay circuit 56 added. The control system computer has been connected to control the operation of the video delay circuit 56 as to accomplish the requisite image transformation by selective storage and delay of the video signal representing the image to be transformed.

In brief, the system of FIG. 4 operates as follows: A first time varying video signal representative of the image focused on the vidicon 20 is fed to the video delay circuit 56. This video delay circuit has a delay time which can be instantaneously varied in either direction, i.e., more or less delay. The resultant output from the video delay circuit 56 is a second time varying video signal which has been generated as the result of the combined operation of the video delay 56 and the control system computer 54.

FIGS. 5 and 6 demonstrate two types of discontinuous transformations which can be accomplished by the system of the present invention. In FIG. 5(a) the image is to be transformed by deleting the portion indicated between the dashed lines. The resulting transformation is shown in FIG. 5(b) with the point of discontinuity indicated by the dashed line.

FIG. 6 illustrates another type of discontinuous transformation. The original image of FIG. 6(a) is to be transformed by taking the portion to the right of the dashed line and placing that portion on the left side. The transformed image is shown in FIG. 6(b) with what was previously the right edge of the image now indicated by the dashed line.

Reference is now made to FIG. 7 for an example of a detailed video delay circuit 56. The input to the delay circuit 56 is an analog voltage signal whose amplitude is a function of the intensity of the portion of the image presently being scanned by the vidicon 20. This time varying video signal is fed to an analog-to-digital converter 58 in the video delay circuit 56. The video signal is converted to a digital number that may be, for example, a six bit digital code representative of the instantaneous amplitude of the input signal each time it is sampled and converted. Although any of several sampling type A/D converters may be used, a video converter manufactured by Micro Consultants, Ltd., Type AN-D1-802 Vid will suffice. The digital signal from the A/D converter is then fed to some form of digital delay unit 60. A number of different possible digital delay units are shown and described in FIGS. 8-10 hereinafter. Whatever form of digital delay unit 60 is used, the unit will have some predetermined delay which can then be varied by appropriate signals from the control system computer 54 so as to achieve the desired image transformation. If the digital delay unit has the capacity to store N bits of data, the present delay might be any value up to N. In order to allow for image transformation in both directions, a preset delay of N/2 might be preferable.

The delayed signals from the digital delay unit 60 are fed to a digital-to-analog converter 62 for conversion back to a time varying video signal which can be displayed by CRT 32. This second time varying video signal is thus a function of the output of the vidicon 20 as transformed by the requisite operation of the control system computer 54 and the video delay circuit 56.

Referring back to FIGS. 5 and 6 it will be apparent that the image transformation shown in FIG. 6(b) is the result of a fixed constant delay in the video delay circuit 56. The transformation shown in FIG. 5(b), on the other hand, is the result of varying the delay during the scanning of the image so as to instantaneously decrease the amount of delay at the appropriate time during the scanning of the image and for an appropriate amount of time so as to delete that portion of the image between the two dashed lines in FIG. 5(a).

FIG. 8 constitutes a first embodiment of the digital delay unit 60 of FIG. 7. In this embodiment a tapped delay line 64 is utilized to store the digital signal from A/D converter 58. The sections of the delay line 64 are connected to a multi-position selector switch 66. The control system computer 54 determines the position of switch 66 so as to get the desired amount of delay. Although switch 66 is depicted in FIG. 8 as a conventional mechanical-type selector switch it will be apparent that this representation is symbolic only. In an actual application the function of selector switch 66 would necessarily be performed by an appropriately designed combination of solid state logic elements such as gates and the like so as to allow for the high speed switching required. It will also be apparent that the tapped delay line 64 could be replaced by some other type of circulating storage device such as a solid state shift register. It would also be possible to utilize a magnetic recording system (disk or drum) or a binary weighted delay line of the type shown in FIG. 11.

FIG. 9 illustrates yet another and somewhat preferable embodiment of the digital delay unit 60 of FIG. 7. In this embodiment a random access memory (R.A.M.) 68 receives the digital signal from A/D converter 58 and stores that signal for the delay required to accomplish the requisite image transformation. Although the precise configuration of R.A.M. 68 will depend upon the choice of other system components and design parameters a Texas Instruments Sn 74200 256-bit Read/Write Memory unit is one type of R.A.M. that will suffice. As many of these units as required by the requisite amount of storage capacity can be interconnected to make up the R.A.M. 68.

The digital input signal is applied to the input terminal D1. The enable input terminal Me is shown grounded so as to provide for continuous operation. The write input terminal We is connected to a source of high frequency clock pulses Cp. Each time the clock signal CP is at "low" the digital information present at input D1 will be stored in the desired location of R.A.M. 68 as indicated by the signal present at the ADDRESS input terminals. Similarly each time the clock signal Cp is at "high" the R.A.M. 68 will read out the signal stored in the location identified by the signal at the ADDRESS input terminals. The read out appears at output terminal R which is connected to D/A converter 62 for conversion to the desired output video signal.

From the foregoing it will be apparent that R.A.M. 68 will carry out the desired delay function by appropriate control of the signals at its ADDRESS input terminals during the alternating read and write cycles that occur at each "low" and "high" of the clock signal Cp.

Selection of the appropriate ADDRESS signal is accomplished by the combination of a multiplexer (MUX) 70, a high speed parallel digital adder 72 and a digital counter 74. Although any compatible adder will suffice, a Texas Instrument high speed parallel adder, SN7483, is exemplary. The counter 74 is connected to the clock signal CP so as to count continuously with each cycle of the clock pulse. The counter 74 has a capacity of N where N equals the total number of storage locations in R.A.M. 68. As shown, counter 74 will count continuously from 0 to N and then back to 0 advancing one count with each clock pulse Cp. For the purposes of the present explanation it will be assumed that counter 74 is a seven bit binary counter having a maximum count of 255 (1111111).

The multiplexer 70 has inputs A,B and an output Q. The output Q will be the same as the signal on the input terminal A when the select input terminal S is at "high". Conversely the output Q will be the same as the input at B if the signal at S is at "low". In short, MUX 70 operates according to the following truth table:

| S | Q |
|---|---|
| High | A |
| Low | B |

Since the A input of MUX 70 is connected to the control system computer 54 the output Q will reflect the required amount of delay each time the clock pulse Cp is at "high". Further since the B input is grounded the output Q will represent the number zero each time the clock pulse Cp is at "low".

The output Q of MUX 70 is connected one input (A) of the adder 72. The other input (b) is connected to the counter 74. The output Q (Q=A + B) is connected to the ADDRESS terminals of R.A.M. 68.

Assume that the counter 74 begins at one (0000001). During the "low" portion of the clock signal Cp the output of MUX 70 will also be zero (0000000) (from the grounded input B) so that the output of the adder 72 will be one (zero - one). Since the R.A.M. 68 is in the write mode when the clock pulse is at "low" the digital signal from A/D converter 58 will be stored in that portion of R.A.M. 68 associated with an input address 0000001.

When the clock signal Cp changes to "high" the read cycle is initiated. The output of MUX 70 changes to the required delay value present at A. Assume that the requisite delay at this time is 128 bits and that the R.A.M. has previously been addressed for one full cycle so as to contain information in each of its 256 memory locations. The decimal number 128 is 1000000 in binary. That number is added to the counter output 0000001 so that 1000001 is the resulting address to R.A.M. 68. The data stored in that portion of the memory is read out at this point.

The operation of the digital delay unit of FIG. 9 can be seen by reference to FIG. 10 which illustrates the state of the counter 74, the input signals A,B and the ADDRESS locations during the READ and WRITE cycles as the counter progresses with each clock pulse Cp.

The foregoing illustration has been limited to a constant delay value throughout the image transformation. It is, however, apparent that the delay can (and in the case of photogrammetric applications will) change during the course of an image transformation simply by changing the input A to MUX 70 when a change in delay is desired. Once again, compare FIG. 6 (constant delay during transformation) with FIG. 5 (variable delay during transformation).

There has been disclosed an improved system for the transformation of images, both continuous and discontinuous, which has desirable characteristics not found in the prior art method. While this system has been disclosed with reference to the preferred embodiments it will be understood by those skilled in the art that various changes and modifications can be made in the system without departing from the inventive concepts.

What is claimed is:

1. A system for the transformation of images comprising:
   a. scanning means for examining the image to be transformed so as to generate a first time-varying video signal representative of said image;
   b. variable delay means operative to instantaneously increase or decrease the amount of delay therein, said delay means being operatively connected to said scanning means, said delay means being operative to store said first time-varying video signal and to generate a second time-varying video signal which is a function of said first time-varying video signal and the instantaneous delay of said variable delay means; and
   c. reproduction means operatively connected to said variable delay means.

2. The image transformation system set forth in claim 1 wherein said reproduction means is operative to accept said second time-varying video signal and produce the transformed image therefrom.

3. The image transformation system set forth in claim 2 wherein said variable delay means comprises;
   a. an analog-to-digital converter for periodically converting said first time-varying video signal to a first digital signal which is proportional to the instantaneous level of said first time-varying video signal;
   b. variable digital storage means operatively connected to said analog-to-digital converter for storing said first digital signal for a pre-determined time; and c. a digital-to-analog converter operatively connected to said variable storage means for converting the output of said variable digital storage means to said second time-varying video signal.

4. The image transformation system set forth in claim 3 wherein said variable digital delay means comprises random access memory means.

5. The image transformation system set forth in claim 4 wherein said random access memory means comprises:

a. a random access memory having its write input operatively connected to said analog-to-digital converter and its read output operatively connected to said digital-to-analog converter; and b. a digital adder operatively connected to the address input of said random access memory, said digital adder being operative to select the read and write locations for said random access memory.

6. The image transformations system set forth in claim 5 further comprising a multiplexer and a digital counter connected to the inputs of said digital adder.

* * * * *